May 20, 1924.

S. BARDY 1,494,405

FRAMING DEVICE

Filed Oct. 12, 1921

Patented May 20, 1924.

1,494,405

UNITED STATES PATENT OFFICE.

SAMUEL BARDY, OF PHILADELPHIA, PENNSYLVANIA, ASSIGNOR, BY MESNE ASSIGNMENTS, TO BARDY PROJECTOR CO., OF PHILADELPHIA, PENNSYLVANIA, A CORPORATION OF DELAWARE.

FRAMING DEVICE.

Application filed October 12, 1921. Serial No. 507,340.

*To all whom it may concern:*

Be it known that I, SAMUEL BARDY, a citizen of the United States, residing at Philadelphia, county of Philadelphia, and State of Pennsylvania, have invented a new and useful Improvement in Framing Devices, of which the following is a full, clear, and exact description, reference being had to the accompanying drawings, which form a part of this specification.

This invention relates to an improvement in framing devices for moving picture projecting machines and is designed to provide an efficient device adapted to be actuated electrically and which may be actuated from a point or points in any desired location.

Another object of my invention is to provide a framing device which will not jerk the film or place any stress on the walls surrounding the sprocket openings in the film.

The precise nature of my invention will be best understood by reference to the accompanying drawings, which will now be described, it being premised, however, that various changes may be made in the construction and arrangement of the parts without departing from the spirit and scope of my invention as defined in the appended claims.

Fig. 1 of the drawings is a front view of one form of machine shown somewhat diagrammatically and which is provided with one form of my improved framing device.

Figure 1:
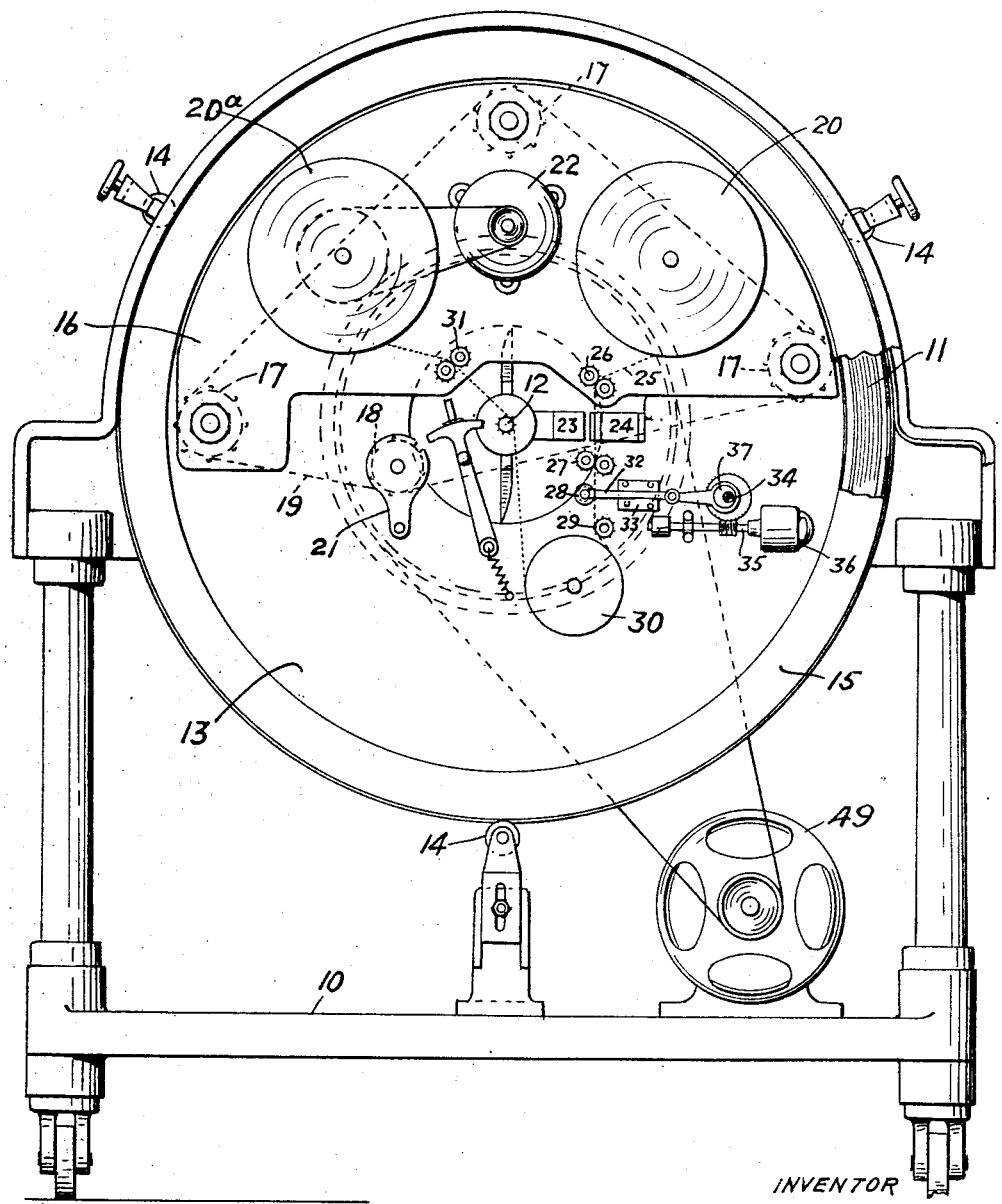

Referring to the accompanying drawings, 10 designates the main frame of the picture projecting machine and 11 the lens drum which is continuously rotated when a picture is exhibited, as set forth in my application Serial No. 486,078, filed July 20, 1921. 12 is the film feeding sprocket wheel which is driven in synchronism with the lens drum. 13 is a frame which is adjustably mounted between the rollers 14 having a shield portion 15 enclosing the lens drum, and which frame carries all of the parts of the machine with the exception of the lens drum, film feed sprocket wheel and their driving connections. Mounted within the frame 13 is the film magazine which is moved into and out of the frame 13 by means of the sprocket wheels 17 and 18 which are interconnected by a chain 19 and which are actuated by a crank 21 connected to sprocket 18, as clearly disclosed in the above entitled application.

Mounted within the magazine 16 is a film feed reel 20 and a film take-up reel 20ª, the latter of which is driven by a motor 22 to take up the film as fast as fed by the sprocket wheel 12.

Mounted in the frame 13 is a source of light and a projecting lens, which I have shown diagrammatically at 23 and 24, respectively.

The film strip 25 passes from the feed reel 20, between guide rollers 26, between the source of light 23 and projecting lens 24, over rollers 27, 28 and 29, around the film measuring wheel 30 and feed sprocket wheel 12, between guide rollers 31, and from the guide rollers 31 to the take-up reel.

The film measuring wheel is connected in any desired manner to the synchronizing mechanism, such as disclosed in my application Serial No. 450,575, filed March 8, 1921.

The guide rollers 27 and 29 rotate about axes mounted on the adjustable frame 13, while the roller 28 is carried by a slide 32 arranged to reciprocate in guide 33 mounted on frame 13. Journalled in suitable bearings carried by frame 13 is a shaft 34 which is driven by worm and worm wheel connections between said shaft and a shaft 35 of an electric motor 36. Connected to the slide 32 and an eccentric on the shaft 34 is an eccentric rod 37. The eccentric has sufficient throw to move the slide 32 and roller 28 a sufficient distance between rollers 27 and 29 to vary the length of film between rollers 27 and 29 somewhat more than the width of a picture. Assuming, for example, that there are eighteen pictures between rollers 27 and 29 when the strip is straight as indicated in Fig. 1, there will be slightly more than nineteen pictures between said rollers when roller 28 is moved to the right to its extreme position.

Figure 2:
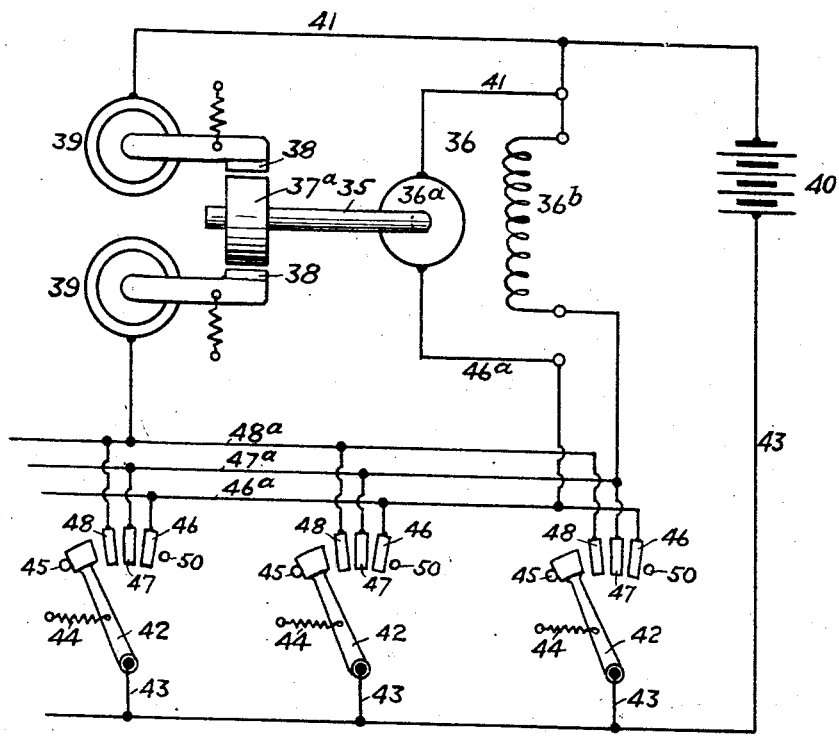
Fig. 2 is a diagram illustrating one form of electrical connection.

In Fig. 2 I have shown one form of electrical connections for the motor and in which the circuit is so arranged that the picture can be framed from a number of places adjacent to or remote from the machine.

In this figure 36ª designates the armature of the motor and 36ᵇ the field coil. Connected to the shaft 35 of the motor is a brake wheel 37ª arranged to be frictionally engaged by brake members 38 connected to the cores of electro-magnets 39 as described in the above entitled application Serial No. 450,575. 40 is a battery or suitable source of electrical energy, one pole of which is connected to one pole of the armature 36ª, one pole of the field 36ᵇ and one pole of the magnets 39 by means of wires 41. The other pole of battery 40 is connected to movable switch arms 42, there being three shown, by wires 43. Each switch arm is provided with a spring 44 to normally retain it against its stop 45. 46, 47 and 48 are contacts, there being one set for each switch arm. The contacts 46 are connected to each other and the other pole of the armature 36ª by wires 46ª. The contacts 47 and 48 of the different sets are similarly connected to each other, and the other poles of the field coil 36ᵇ and coils 39 of the brake magnets by wires 47ª and 48ª, respectively. The free end of each switch arm 42 is of sufficient width to span two of its contacts, but not of sufficient width to simultaneously close the circuit through the three contacts.

When operating the device, the lens drum 11 is continuously operated by means of its motor, while the film feed sprocket is driven by the lens drum through the medium of the clutch mechanism, such as described in my application Serial No. 486,078. The film reels are also actuated in the manner described in the last mentioned application by the motor 49.

If the pictures should get out of timed relation to the lenses, the motor 36 is rotated to vary the length of film between the rollers 27 and 29 to bring the pictures into timed relation to the lens reel 11 and when in such relation the movement of motor 36 is arrested.

The motor 36 may be set into motion by means of any of the various switches previously described, one of which is under the control of the operator, while the others are distributed at suitable points through the theatre. When it is desired to move the film relative to the lens to frame the pictures, any one of the switch arms 42 is moved to the right against its stop 50, and during such movement the circuit is first closed through brake magnet coils 39, then field coil 36ᵇ; the circuit through the brake magnet coils is then broken and the circuit through the armature 36ª is closed. The circuit to the motor is maintained closed until the length of the film between rollers 27 and 29 has been varied sufficiently to frame the picture and as soon as this has occurred, the switch arm is released and its spring 44 will move it to the position shown in Fig. 2.

The switch arm 42 in its movement from stop 50 to stop 42 will first break the circuit through the armature 36ª of the motor and maintain the circuit through the field coil 36ᵇ, which will act to arrest the movement of the armature 36ª and its shaft and then close the circuit to the coils 39 of the brake magnets which will brake the movement of the shaft 45, and in the further movement of the switch arm 42 the circuit to the field coil will first be broken and then the circuit to the coils 39 of the brake magnets.

Figure 3:
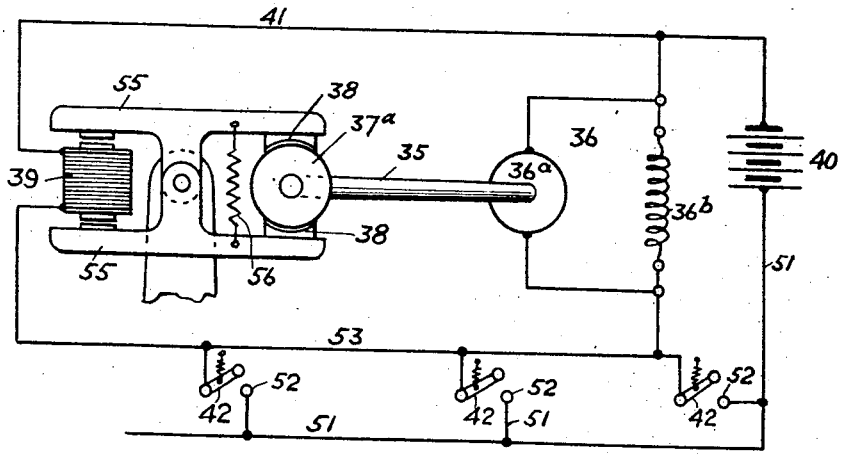
Fig. 3 is a similar view illustrating another form of electrical connection.

In Fig. 3 of the drawings I have shown another form of brake device and electrical connections. In this form the brake members 38 are connected to the ends of levers 55 pivoted to each other between their ends as well as to a suitable support.

The brake magnet or magnets 39 are interposed between the ends of the levers 55 opposite the ends of the levers to which the brake members are connected, and 56 is a spring acting to retain the brake members in engagement with brake wheel. One pole of the source of energy 40 is connected to one pole of armature 36ª, field coil 36ᵇ and the winding of brake magnet 39 by wires 41, while the other pole of the source of energy is connected to the switch contacts 52 of three switches by means of wires 51. The other poles of armature 36ª, field coil 36ᵇ, and magnet 39 are connected to the arms 42 of the three hand switches.

The parts and electrical connections are such that when the current from the source of energy through the different circuits is broken, the brake members 38 will be held in contact with the brake wheel 37. When it is desired to rotate motor 36 to frame the picture, any one of the three switches is closed which will close the circuit through the motor and the brake magnet, cause the motor 36 to be rotated and also release the brake. When the switch is opened, the circuit to the motor and brake will be broken and the brake will be applied to the motor shaft by the spring 56 and arrest the rotation thereof.

The advantages of my invention result from the provision of means for moving the film relative to the compensating lenses or system without affecting the feeding sprocket.

A further advantage results from the provision of electrically actuated means for moving the film relative to the compensating system, whereby I am enabled to place control devices for the actuating means at any desired point or points adjacent to or remote from the machine.

Having now fully described my invention, what I claim and desire to protect by Letters Patent is:

1. A framing device for a moving picture machine having a feed reel, a take-up reel, a feed sprocket wheel between the reels, means between the reels for varying the length of film between the reels to frame the picture, a motor for actuating said means, brake means for the motor, means for actuating the motor, and means for actuating the brake.

2. A framing device for a moving picture machine having a feed reel, a take-up reel, a feed sprocket wheel between the reels, electrically actuated means between the reels for varying the length of film between the reels to frame the picture, and a brake device for the electrically actuated means.

3. A framing device for a moving picture machine having a feed reel, a take-up reel, a feed sprocket wheel between the reels, electrical means for varying the length of film between the reels, an electrical brake for the electrical means, and a plurality of switches for closing the circuit through said electrical means and electrical brake.

4. A framing device for a moving picture machine having a continuously moving lens drum and film, a feed reel for the film, a driven taken-up reel for the film, a feed sprocket wheel for the film, means for driving the feed sprocket wheel and the lens drum in timed relation to each other, electrically actuated means for synchronizing the film and lens drum without affecting the film feeding devices, an electrically actuated brake for the electrically actuated means, and a plurality of switches, each switch being adapted to control an electrical circuit to first pass a circuit through the electrically actuated means and then through the brake.

In testimony of which invention, I have hereunto set my hand, at Philadelphia, Pa., on this 4th day of October, 1921.

SAMUEL BARDY.